US011107022B2

(12) United States Patent
Dhandapani et al.

(10) Patent No.: US 11,107,022 B2
(45) Date of Patent: Aug. 31, 2021

(54) ROLE-BASED ACCESS CONTROL WITH BUILDING INFORMATION DATA MODEL FOR MANAGING BUILDING RESOURCES

(71) Applicant: CBRE, Inc., Los Angeles, CA (US)

(72) Inventors: Chandra Dhandapani, Dallas, TX (US); Sandeep Dave, Dallas, TX (US); Kranthi Dandamudi, Dallas, TX (US); Amit Mawkin, Dallas, TX (US)

(73) Assignee: CBRE, INC., Los Angeles, CA (US)

( * ) Notice: Subject to any disclaimer, the term of this patent is extended or adjusted under 35 U.S.C. 154(b) by 136 days.

(21) Appl. No.: 16/549,589

(22) Filed: Aug. 23, 2019

(65) Prior Publication Data

US 2020/0097875 A1 Mar. 26, 2020

Related U.S. Application Data

(60) Provisional application No. 62/754,442, filed on Nov. 1, 2018, provisional application No. 62/736,872, filed on Sep. 26, 2018.

(51) Int. Cl.
*G06Q 10/06* (2012.01)
*G06Q 30/00* (2012.01)
*H04W 4/024* (2018.01)
*H04W 4/33* (2018.01)
*G01C 21/20* (2006.01)
*G06Q 10/02* (2012.01)
(Continued)

(52) U.S. Cl.
CPC ..... *G06Q 10/06313* (2013.01); *G01C 21/206* (2013.01); *G06Q 10/02* (2013.01); *G06Q 30/016* (2013.01); *H04W 4/023* (2013.01); *H04W 4/024* (2018.02); *H04W 4/33* (2018.02); *H04W 12/63* (2021.01)

(58) Field of Classification Search
CPC .. G06F 21/6218; G06F 16/282; G06F 16/185; G06F 21/31; G06F 21/6227; G06F 21/604; H04L 63/105; G06Q 10/06; G06Q 10/067
See application file for complete search history.

(56) References Cited

U.S. PATENT DOCUMENTS 5,535,332 A * 7/1996 Ishida ................... G06F 16/176
709/205
5,778,222 A * 7/1998 Herrick ............... G06F 21/6218
707/702
(Continued)

OTHER PUBLICATIONS

Bertino, Elisa et al., Access Control for Databases: Concepts and Systems now Publishers, Inc., 2011 (Year: 2011).*
(Continued)

*Primary Examiner* — Scott L Jarrett
(74) *Attorney, Agent, or Firm* — DLA Piper LLP US

(57) ABSTRACT

In accordance with some embodiments, a method managing information about building resources is disclosed. In accordance with some embodiments, a method for providing data to an end user application is disclosed. A method may include identifying a data model representing information about building resources for tenants and investors in various locations, updating information in the data model, and providing the updated information to a client device for use in an application that provides information about building resources.

20 Claims, 15 Drawing Sheets

(51) Int. Cl.
*H04W 4/02* (2018.01)
*H04W 12/63* (2021.01)

(56) References Cited

U.S. PATENT DOCUMENTS

| | | | |
|---|---|---|---|
| 6,701,345 B1* | 3/2004 | Carley | G06F 16/252 |
| | | | 709/205 |
| 6,871,140 B1 | 3/2005 | Bulkin et al. | |
| 6,985,902 B2 | 1/2006 | Miller et al. | |
| 7,007,083 B1* | 2/2006 | Chesley | H04L 12/1822 |
| | | | 709/206 |
| 7,127,462 B2* | 10/2006 | Hiraga | G06F 21/6227 |
| 7,554,437 B2 | 6/2009 | Axelsen | |
| 7,792,860 B2* | 9/2010 | Shrivastava | H04L 12/185 |
| | | | 707/786 |
| 7,865,959 B1* | 1/2011 | Lewis | G06F 21/6218 |
| | | | 726/26 |
| 8,112,100 B2 | 2/2012 | Frank et al. | |
| 8,149,104 B2 | 4/2012 | Crum | |
| 8,320,939 B1 | 11/2012 | Vincent | |
| 8,352,296 B2 | 1/2013 | Egger et al. | |
| 8,402,514 B1* | 3/2013 | Thompson | H04L 63/08 |
| | | | 726/4 |
| 9,031,987 B2* | 5/2015 | Williamson | G06F 16/9027 |
| | | | 707/791 |
| 9,204,257 B1 | 12/2015 | Mendelson | |
| 9,280,646 B1* | 3/2016 | Nandyalam | G06F 21/6218 |
| 9,294,723 B2 | 3/2016 | Hanson et al. | |
| 9,380,417 B1 | 6/2016 | Bigal et al. | |
| 9,432,354 B2* | 8/2016 | Wadhwa | H04L 63/105 |
| 9,766,079 B1 | 9/2017 | Poel et al. | |
| 9,838,848 B2 | 12/2017 | Huang et al. | |
| 9,852,388 B1 | 12/2017 | Scheper et al. | |
| 9,980,112 B1 | 5/2018 | Bailey et al. | |
| 10,242,232 B1* | 3/2019 | Hurry | G06F 21/6281 |
| 10,681,053 B2* | 6/2020 | Van Rotterdam | G06F 16/93 |
| 10,911,454 B2* | 2/2021 | Reddy | G06F 21/604 |
| 2004/0162906 A1* | 8/2004 | Griffin | G06F 21/6218 |
| | | | 709/229 |
| 2005/0197977 A1 | 8/2005 | Kalinoski | |
| 2005/0273346 A1 | 12/2005 | Frost | |
| 2006/0015375 A1 | 1/2006 | Choi et al. | |
| 2006/0218394 A1* | 9/2006 | Yang | G06F 21/604 |
| | | | 713/167 |
| 2007/0001904 A1 | 1/2007 | Mendelson | |
| 2007/0162315 A1 | 7/2007 | Hodges | |
| 2008/0109289 A1 | 5/2008 | Coller et al. | |
| 2008/0162198 A1 | 7/2008 | Jabbour et al. | |
| 2008/0270408 A1* | 10/2008 | Ratnala | G06F 21/6218 |
| 2009/0327227 A1 | 12/2009 | Chakra et al. | |
| 2010/0274855 A1 | 10/2010 | Wassingbo | |
| 2012/0105202 A1 | 5/2012 | Gits et al. | |
| 2012/0166147 A1 | 6/2012 | Kwak | |
| 2012/0166497 A1 | 6/2012 | Choi et al. | |
| 2013/0080350 A1* | 3/2013 | Bhola | G06Q 10/067 |
| | | | 705/348 |
| 2013/0298192 A1* | 11/2013 | Kumar | G06F 21/52 |
| | | | 726/3 |
| 2014/0046936 A1* | 2/2014 | John | G06F 16/212 |
| | | | 707/723 |
| 2014/0058778 A1 | 2/2014 | Belkrylov et al. | |
| 2014/0229099 A1 | 8/2014 | Garrett et al. | |
| 2016/0098572 A1* | 4/2016 | Povalyayev | G06F 21/6218 |
| | | | 726/28 |
| 2018/0075229 A1 | 3/2018 | Jan | |
| 2018/0081904 A1* | 3/2018 | Cosby | G06F 16/23 |
| 2019/0173886 A1* | 6/2019 | Van Rotterdam | G06F 21/604 |
| 2020/0074107 A1* | 3/2020 | Barbas | G06F 16/24564 |

OTHER PUBLICATIONS

Drkusic, Emil, A Real Estate Agency Data Model Vertabelo.com, Feb. 15, 2017 (Year: 2017).*
Commercial Properties Data Model DataBase Answers, Ltd., 2013 (Year: 2013).*
Drkusic, Emil, A Database Model for Renting Service Vertabelo. com, Mar. 22, 2017 (Year: 2017).*
A Data Model for a Leasing Office Vertabelo.com, Mar. 22, 2017 (Year: 2017).*
Oracle Database—JDBC's Developers Guide 12c Release Oracle, Jun. 2014 (Year: 2014).*
Schwartz, Baron, How to Build Role-Based Access Control in SQL Databases, Aug. 16, 2006 (Year: 2006).*
Oracle Identify Analytics User's guide, 11g Release 1 Oracle, Aug. 2010 (Year: 2010).*
System Administration Guide: Security Services Oracle, Sep. 2010 (Year: 2010).*
Peters, Kathleen, The Design of a Change Notification Server for Clients of a Passive Object Oriented Database Management System, Simon Fraser University, Jul. 1992 (Year: 1992).*
Elmasri et al, "Chapter 23: Database Security and Authorization", Fundamentals of Database Systems, 4th Edition, pp. 731-744 (2004).
PCT International Application No. PCT/US2019/052650, International Search Report and Written Opinion of the Inernational Searching Authority, dated Dec. 5, 2019.
Mirachi et al, "Supporting Facility Management Processes through End-Users' Integration and Coordinated BIM-GIS Technologies", International Journal of Geo-Information, vol. 7, No. 191, pp. 1-20, May 16, 2018.
PCT International Application No. PCT/US2019/052653, International Search Report dated Mar. 19, 2020, 8 pages.
PCT International Application No. PCT/US2019/052653, Written Opinion of the International Searching Authority dated Mar. 19, 2020, 23 pages.

* cited by examiner

ROLE-BASED ACCESS CONTROL WITH BUILDING INFORMATION DATA MODEL FOR MANAGING BUILDING RESOURCES

CROSS-REFERENCE TO RELATED APPLICATION

This application claims priority to and the benefit of U.S. Provisional Application 62/754,442 titled "Systems and Methods for Managing Information about Building Resources," filed on Nov. 1, 2018, the disclosure of which is incorporated herein by reference in its entirety. This application also claims priority to and the benefit of U.S. Provisional Application 62/736,872 titled "Systems and Methods for Providing Information about Building Resources," filed on Sep. 26, 2018, the disclosure of which is incorporated herein by reference in its entirety.

BACKGROUND

Buildings often have many resources. For example, spaces could be considered a resource. An office building, for example, might have a variety of spaces, such as offices, conference rooms, common spaces, restrooms, pantries, and other types of spaces. In a large building, these spaces might be spread across a large floor, or across multiple floors. To find a particular space, an employee might wander around the building looking at room numbers, or might look at a map of the building to identify where the particular space might be located. An employee might also walk to a particular space, only to find that the employee cannot use the space because it is already occupied. Once arriving at a particular space, a person might have to spend time configuring the space to an employee's liking.

A tool in a building might also be considered a resource. An office building, for example, might have a variety of tools, such as printers, projectors, computers, telephones, conference phones, fax machines, or other type of equipment used in the workplace. In a large building, these tools might be dispersed in particular locations across a large floor, or across multiple floors. To find a particular tool, an employee might ask another employee or support person, or wander around the building looking for the particular tool.

An amenity in a building might also be considered a resource. An office building, for example, might have a variety of amenities, such as coffee makers, microwaves, refrigerators, and vending machines. In a large building, these amenities might be spread across a large floor, or across multiple floors. To find a particular amenity, an employee might ask another employee or support person, or wander around the building looking for the particular amenity.

A person in a building might also be considered a resource. An office building, for example, might have a number of employees. In a large building, it might be difficult to determine where an employee is at any one time, and might be difficult to coordinate a meeting with a particular person. To find a particular person, an employee might ask another employee or support person, or wander around the building looking for the particular person.

An issue might sometimes arise with a building resource. For example, a tool or amenity might break, or a particular space might be dirty. An employee might report such an issue to a support person in order to get the issue resolved. Alternatively, a support person might periodically check for issues, and the issue might not get resolved until it is noticed by the support person.

For some buildings, such as office buildings, there are times when a person that is not an employee of a tenant in the building might need to visit the building, but may not have access to the building. In these situations, the person visiting the building might have to check in with security staff, or might need to wait in a lobby for an employee to let the person into the building.

SUMMARY

Embodiments of the present disclosure relate to systems and methods for managing information about building resources. In addition, embodiments of the present disclosure relate to solutions that allow users to update information about building resources at different levels in a hierarchical data model, and that provide the updated information to client devices for use in an application.

In accordance with some embodiments of the present disclosure, there is provided a computer-implemented method for providing data to an end user application, the method comprising authenticating, by a server system comprising one or more processors, a user based on a credential input by the user, and identifying, by the server system, a role associated with the user. The method also comprises identifying, by the server system, a data model representing information about building resources for tenants and investors in various locations, the data model including a hierarchy of different levels, wherein an ability to add, modify, and delete information at a level in the data model is limited to users having a role associated with that level. The method further comprises enabling, by the server system, the user to add, modify, and delete information at a level in the data model based on the role identified for the user. The method still further comprises updating, by the server system, information in the data model based on information received from the user, and providing, by the server system, the updated information to a client device for use in an application that provides information about building resources.

In accordance with aspects of the disclosure, there are different levels within the data model for one or more of: a root customer, a customer, a region, a building, a floor, an area, or a space.

In accordance with further aspects of the disclosure, the role is one of a super administrator, a customer administrator, a building administrator, a tenant administrator, a client, a vendor, or a concierge.

In accordance with still further aspects of the disclosure, a super administrator is enabled to add, modify, or delete information at any level of the data model.

In accordance with aspects of the disclosure, a customer administrator is an investor customer, a tenant customer, or both an investor customer and a tenant customer.

In accordance with further aspects of the disclosure, a customer administrator adds information to the data model that causes a notice to be sent to client devices associated with an investor customer or tenant customer.

In accordance with still further aspects of the disclosure, a building administrator adds information to the data model that causes information to be sent to client devices associated with all tenants of a building, wherein the information sent to the client devices is one of: a notice, an event, building information, or news.

In accordance with aspects of the disclosure, a tenant administrator adds information to the data model that causes information to be sent to client devices associated with a tenant, wherein the information sent to the client devices is one of: a notice, an event, building information, or news.

Furthermore, in accordance with some embodiments, there is provided a server system for providing data to an end user application, the system comprising one or more memory devices storing instructions, and one or more processors. The one or more processors, when executing the instructions, are configured to identify a role associated with a user, and identify a data model representing information about building resources for tenants and investors in various locations, the data model including a hierarchy of different levels, wherein an ability to add, modify, and delete information at a level in the data model is limited to users having a role associated with that level. The one or more processors, when executing the instructions, are further configured to enable the user to add, modify, and delete information at a level in the data model based on the role identified for the user. The one or more processors, when executing the instructions, are still further configured to update information in the data model based on information received from the user, and provide the updated information to a client device for use in an application that provides information about building resources.

In accordance with aspects of the disclosure, there are different levels within the data model for one or more of: a root customer, a customer, a region, a building, a floor, an area, or a space.

In accordance with further aspects of the disclosure, the role is one of: a super administrator, a customer administrator, a building administrator, a tenant administrator, a client, a vendor, or a concierge.

In accordance with still further aspects of the disclosure, a super administrator is enabled to add, modify, or delete information at any level of the data model.

In accordance with aspects of the disclosure, a customer administrator is an investor customer, a tenant customer, or both an investor customer and a tenant customer.

In accordance with further aspects of the disclosure, a customer administrator adds information to the data model that causes a notice to be sent to client devices associated with an investor or tenant customer.

In accordance with still further aspects of the disclosure, a building administrator adds information to the data model that causes information to be sent to client devices associated with all tenants of a building, wherein the information sent to the client devices is one of: a notice, an event, building information, or news.

In accordance with aspects of the disclosure, a tenant administrator adds information to the data model that causes information to be sent to client devices associated with a tenant, wherein the information sent to the client devices is one of: a notice, an event, building information, or news.

Further still, in accordance with some embodiments, there is provided a non-transitory computer readable medium storing instructions that, when executed by one or more processors, cause the one or more processors to perform a method. The method comprises authenticating a user based on a credential input by the user, and identifying a role associated with the user. The method also comprises identifying a data model representing information about building resources for tenants and investors in various locations, the data model including a hierarchy of different levels, wherein an ability to add, modify, and delete information at a level in the data model is limited to users having a role associated with that level. The method further comprises enabling the user to add, modify, and delete information at a level in the data model based on the role identified for the user. The method still further comprises updating information in the data model based on information received from the user, and providing the updated information to a client device for use in an application that provides information about building resources.

In accordance with aspects of the disclosure, there are different levels within the data model for one or more of: a root customer, a customer, a region, a building, a floor, an area, or a space.

In accordance with further aspects of the disclosure, the role is one of: a super administrator, a customer administrator, a building administrator, a tenant administrator, a client, a vendor, or a concierge.

In accordance with still further aspects of the disclosure, a super administrator is enabled to add, modify, or delete information at any level of the data model.

It is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

It is to be understood that both the foregoing general description and the following detailed description are explanatory only and are not restrictive of the claimed subject matter.

BRIEF DESCRIPTION OF THE DRAWINGS

The accompanying drawings, which are incorporated in and constitute part of this specification, and together with the description, illustrate and serve to explain the principles of various example embodiments.

DETAILED DESCRIPTION

Figure 1:
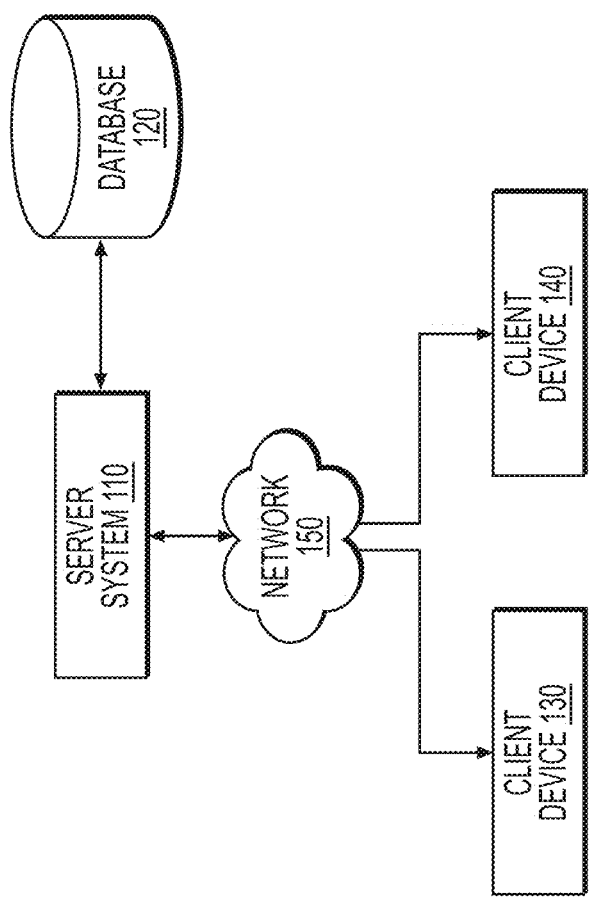
FIG. 1 illustrates an example view of an environment for managing information about building resources, consistent with embodiments of the present disclosure.

In the following description, numerous specific details are set forth regarding the systems and methods of the disclosed subject matter and the environment in which such systems and methods may operate in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

Embodiments of the present disclosure relate to systems and methods for managing information related to building resources. In addition, embodiments of the present disclosure relate to solutions that allow users to update information about building resources at different levels in a hierarchical data model, and that provide the updated information to client devices for use in an application. The application could be, for example, an application as described in U.S. Provisional Application No. 62/736,872, which is incorporated by reference herein.

Buildings often have many resources. For example, spaces could be considered a resource. An office building, for example, might have a variety of spaces, such as offices, conference rooms, common spaces, restrooms, pantries, and other types of spaces. In a large building, these spaces might be spread across a large floor, or across multiple floors. To find a particular space, an employee might wander around the building looking at room numbers, or might look at a map of the building to identify where the particular space might be located. An employee might also walk to a particular space, only to find that the employee cannot use the space because it is already occupied. Once arriving at a particular space, a person might have to spend time configuring the space to an employee's liking.

A tool in a building might also be considered a resource. An office building, for example, might have a variety of tools, such as printers, projectors, computers, telephones, conference phones, fax machines, or other type of equipment used in the workplace. In a large building, these tools might be dispersed in particular locations across a large floor, or across multiple floors. To find a particular tool, an employee might ask another employee or support person, or wander around the building looking for the particular tool.

An amenity in a building might also be considered a resource. An office building, for example, might have a variety of amenities, such as coffee makers, microwaves, refrigerators, and vending machines. In a large building, these amenities might be spread across a large floor, or across multiple floors. To find a particular amenity, an employee might ask another employee or support person, or wander around the building looking for the particular amenity.

A person in a building might also be considered a resource. An office building, for example, might have a number of employees. In a large building, it might be difficult to determine where an employee is at any one time, and might be difficult to coordinate a meeting with a particular person. To find a particular person, an employee might ask another employee or support person, or wander around the building looking for the particular person.

An issue might sometimes arise with a building resource. For example, a tool or amenity might break, or a particular space might be dirty. An employee might report such an issue to a support person in order to get the issue resolved. Alternatively, a support person might periodically check for issues, and the issue might not get resolved until it is noticed by the support person.

For some buildings, such as office buildings, there are times when a person that is not an employee of a tenant in the building might need to visit the building, but may not have access to the building. In these situations, the person visiting the building might have to check in with security staff, or might need to wait in a lobby for an employee to let the person into the building.

Embodiments of the present disclosure can address the challenges associated with finding a particular resource in a building. For example, some embodiments of the present disclosure provide systems and methods that can provide information about building resources. The information may include, for example, a location of a space, tool, amenity, or person in a building. The information may also include, for example, directions from a person's current location to the location of a particular building resource.

Embodiments of the present disclosure can also address the challenges associated with configuring a space prior to its use. For example, some embodiments of the present disclosure provide systems and methods that can configure a space, such as a conference room, in accordance with a particular person's preferences prior to that person using the space. The preferences might include environmental preferences for the space, such as preferences as to the lighting or temperature of the room. The preferences could also include, for example, preferences for a food or beverage to be served in the room. The preferences might also include preferences regarding whether tools are available in a space, such as whiteboards, projectors, or telephones for making a conference call.

Embodiments of the present disclosure can further address the challenges associated with identifying issues with building resources. For example, some embodiments of the present disclosure provide systems and methods that can receive notice of an issue with a building resource, along with information about the issue that needs to be resolved, such as the location of the issue.

Embodiments of the present disclosure can still further address the challenges associated with managing access to building resources by building visitors. For example, some embodiments of the present disclosure provide systems and methods that can provide information about building resources to a building visitor prior to the visitor entering a restricted part of a building.

FIG. 1 illustrates an example view 100 of an environment for managing information about building resources consistent with embodiments of the present disclosure.

As shown in view 100, the environment might include a server system 110. By way of example, server system 110 may include any combination of one or more of backend servers, web servers, databases, mainframe computers, general-purpose computers, personal computers, or other types of computing devices. In some embodiments, server system 110 may be configured to receive and provide information about building resources, implement searches, index information, store information, and/or retrieve information. In some embodiments, server system 110 may be a standalone computing system or apparatus, or it may be part of a larger system. For example, server system 110 may represent distributed servers that are remotely located and communicate over a communications network, or over a dedicated network, such as a local area network (LAN). Server system 110 may include one or more back-end servers for carrying out one or more aspects of the present disclosure.

A client device 130, 140 may be computing device, for example, personal computer, workstation, mobile phone, smart phone, tablet, netbook, electronic reader, personal digital assistant (PDA), laptop computer, smart watch, gaming device, personal organizer, navigation device, and/or other type of computing device. In some embodiments, a client device 130, 140 may be implemented with one or more hardware devices and/or software applications running thereon. For example, a client device 130, 140 might run a software application for providing a user with information about building resources. In some embodiments, one or more of client device(s) 130, 140 may be implemented using a computer system, such as computer system 700 of FIG. 7.

Server system 110 may be implemented as a server system comprising a plurality of servers, or a server farm comprising a load balancing system and a plurality of servers. In some embodiments, a server system 110 may be implemented with hardware devices and/or software applications running thereon. A server system 110 may communicate with client device(s) 130, 140 over network(s) 150. For example, a server system 110 may communicate by transmitting data to and/or receiving data from client device(s) 130, 140. In some embodiments, one or more of server system 110 may be implemented using a computer system, such as computer system 700 of FIG. 7.

As shown in view 100, the environment might also include one or more networks 150. Network(s) 150 may connect server system 110 with client device(s) 130, 140. Network(s) 150 may provide for the exchange of information, such as queries for information and results, between client device(s) 130, 140 and server system 110. Network(s) may include one or more types of networks interconnecting client device(s) 130, 140 and server system 110. For example, one client device 130, 140 may communicate with server(s) 110 using a different type of network 150 than a second client device 130, 140 may use to communicate with server system 110.

Network(s) 150 may include one or more wide area networks (WANs), metropolitan area networks (MANs), local area networks (LANs), personal area networks (PANs), or any combination of these networks. Network(s) 150 may include a combination of one or more of a variety of different network types, including Internet, intranet, Wi-Fi, IEEE 802.11, cellular, Bluetooth, UWB, infrared, satellite, wireless universal serial bus (wireless USB), Ethernet, twisted-pair, coaxial cable, fiber optic, and/or other types of wired or wireless networks.

Server system 110 may store a variety of information about one or more building floors. For example, server system 110 may store a representation of the floorplan of a floor. Server system 110 may also store information about spaces on the floor. Server system 110 may also store information about tools and/or amenities that are available in a particular space.

Server system 110 may also store a variety of additional information. For example, server system 110 may store information about employees, employee contact information, or employee availability. In some embodiments, server system 110 may integrate with office software, such as scheduling software, email software, or personnel management software, to provide this information to server system 110.

In some embodiments, the information stored in server system 110 can be stored as a result of a person having entered the information. For example, a system administrator might use a client device 130, 140 to authenticate with server system 110 with a username and password, and might then be able to enter information about a building's floorplan and resources. An administrator might also be able to modify or reconfigure this information. For example, an administrator might change information about tools available in a room to add an additional tool when that tool has been added to the room. The administrator may enter and/or change the information stored in server system 110 through a user interface, which might enable the information to be entered or changed through entry of text and/or selection of buttons.

Figure 3:
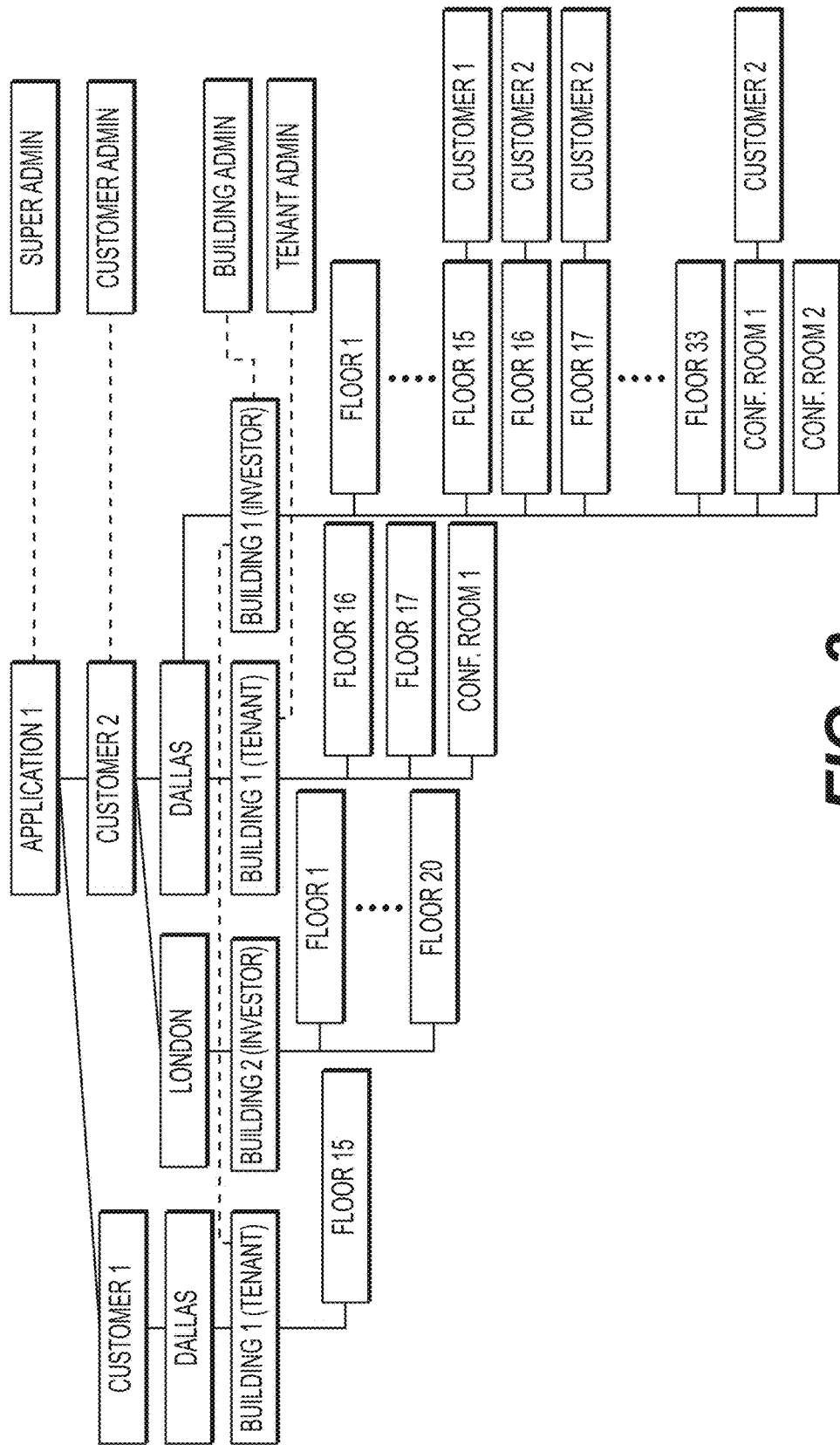
FIG. 3 illustrates an example diagram of a data model, consistent with embodiments of the present disclosure.
Figure 4A:
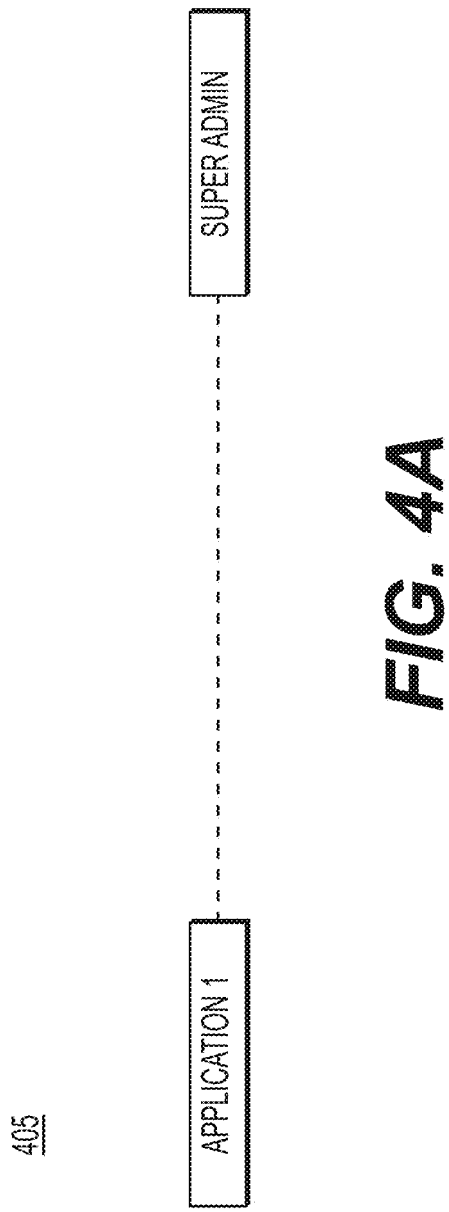
FIGS. 4A-4K illustrate example diagrams of a data model, through varying stages of building the data model, consistent with embodiments of the present disclosure.
Figure 4D:
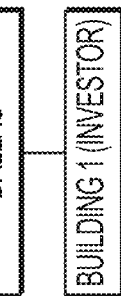
Figure 4C:
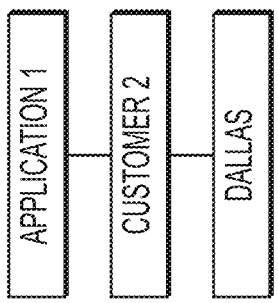
Figure 4B:
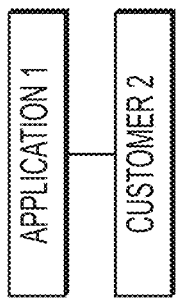
Figure 4E:
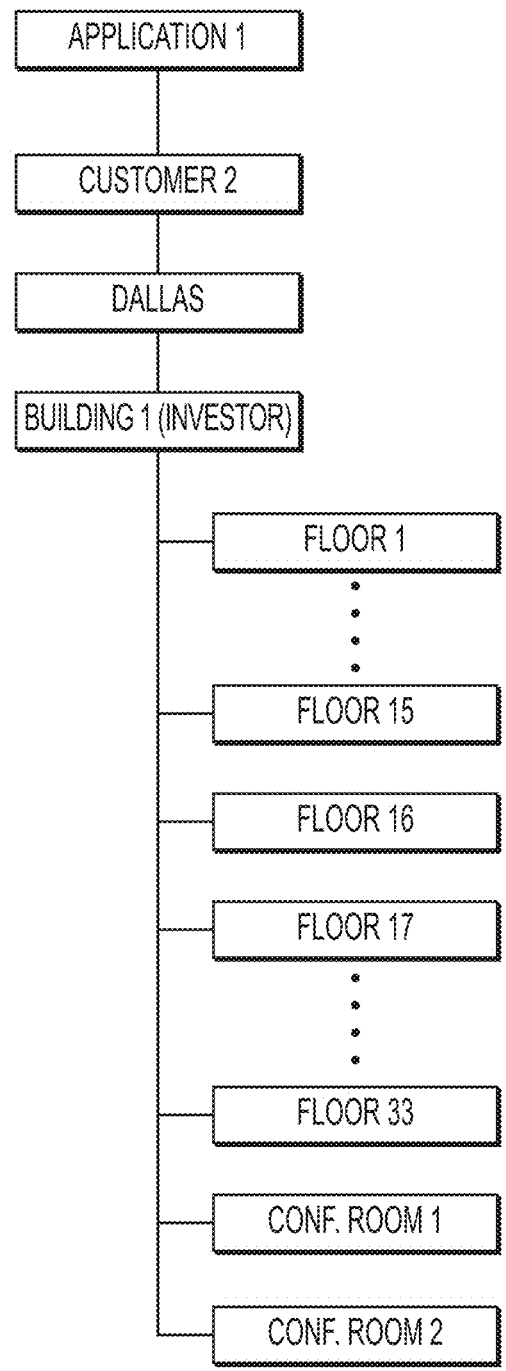
Figure 4F:
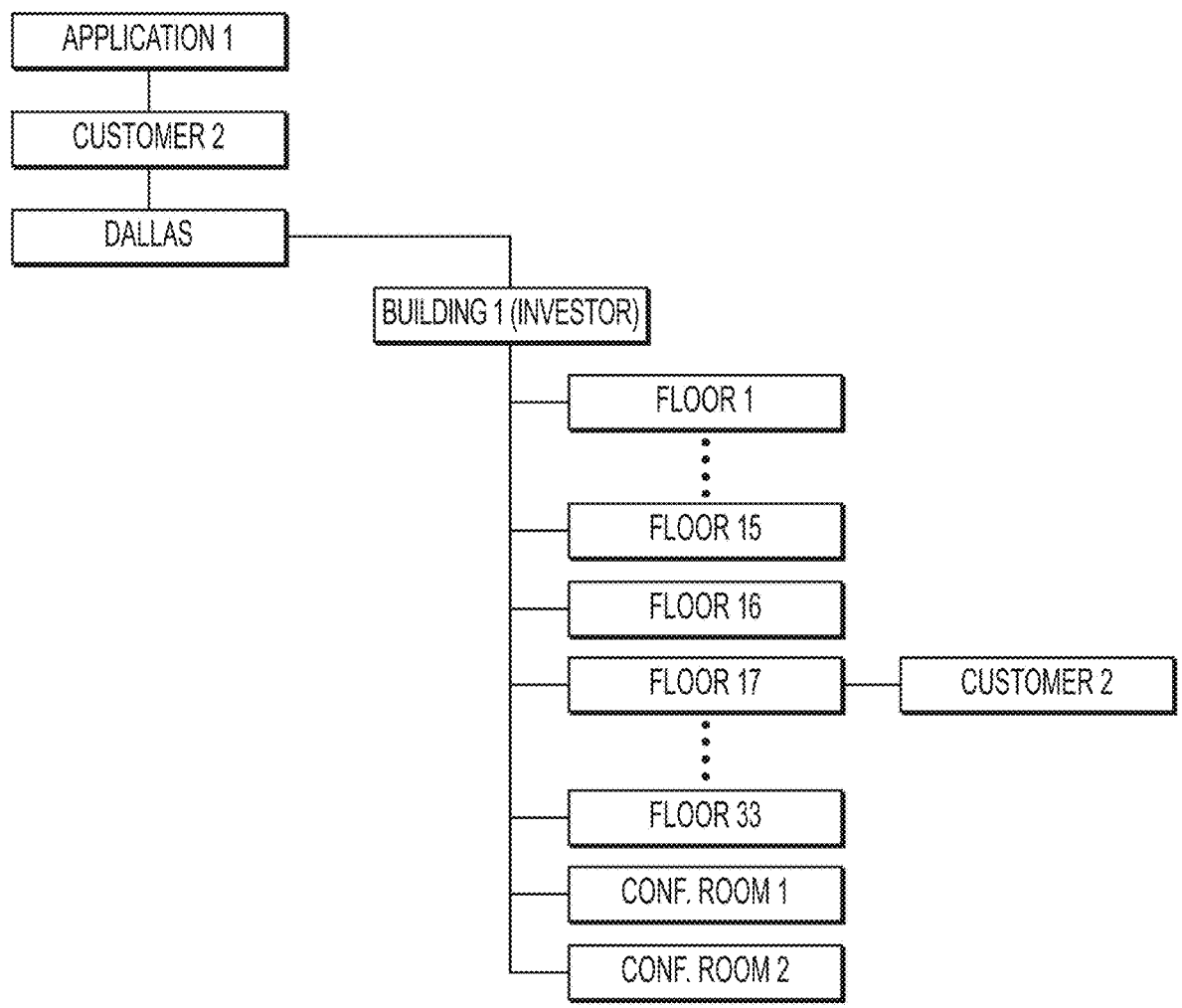
Figure 4G:
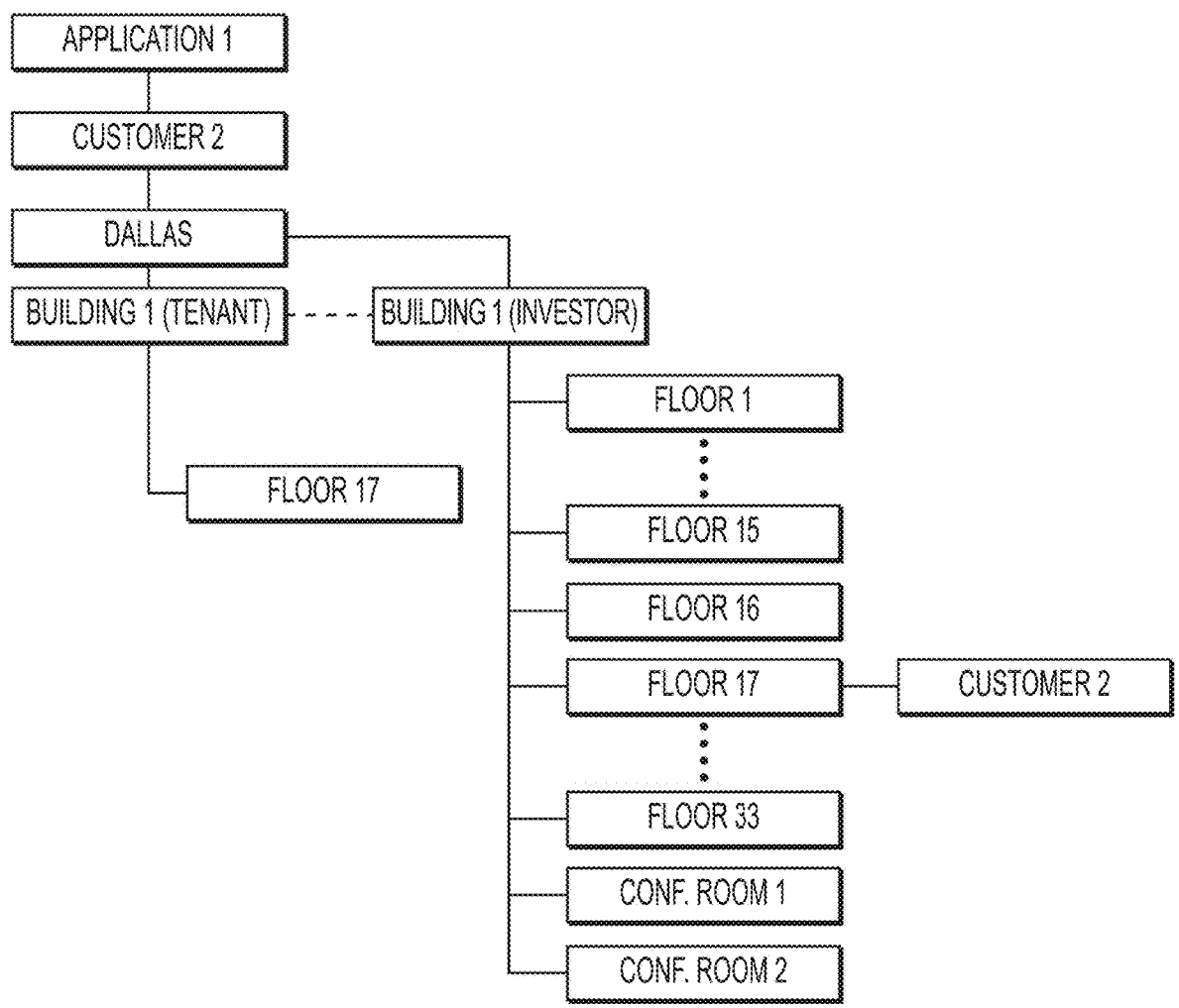

In some embodiments, the information is stored in server system 110 in a data model. Example data models are illustrated in FIGS. 3-5. In some embodiments, the data model is a hierarchical data model, which includes different levels at which the ability to add, delete, or modify information in the data model is limited to users having a particular role. The highest level in the hierarchy of the data model may include a root customer level. The root customer level may be the root of the data model hierarchy. In the example data models illustrated in FIGS. 3-5, "Application 1" is the entity assigned to a node at the root customer level. The next highest level in the hierarchy of the data model may include a customer level. A node at the customer level may be assigned to a customer, such as an investor customer, a tenant customer, or both an investor customer and tenant customer. In the example data models illustrated in FIGS. 3, 4J, and 4K, "Customer 1" and "Customer 2" are the entities assigned to the customer level. In the example data models illustrated in FIGS. 4B-4I, "Customer 2" is the entity assigned to the customer level. In the example data model illustrated in FIG. 5, "Customer 3" and "Customer 4" are the entities assigned to the customer level.

The third highest level in the hierarchy of the data model may include a region level. A node at the region level may be assigned to a region of a customer. In the example data models illustrated in FIGS. 3, 4I, 4J, and 4K, "Dallas" and "London" are assigned to nodes at the region level. In the example data models illustrated in FIGS. 4C-4H, "Dallas" is assigned to a node at the region level. In the example data models illustrated in FIG. 5, "New York" and "Chicago" are assigned to nodes at the region level.

The fourth highest level in the hierarchy of the data model may include a building level. A node at the building level may be assigned to a building in which one of the customers at the customer level is an investor and/or tenant. In the example data model illustrated in FIG. 3, "Building 1 (Tenant)," "Building 2 (Investor)," "Building 1 (Tenant)," and "Building 1 (Investor)" are assigned to nodes at the building level. In the example data models illustrated in FIGS. 4D-4F, "Building 1 (Investor)" is assigned to a node at the building level. In the example data models illustrated in FIGS. 4G and 4H, "Building 1 (Tenant)" and "Building 1 (Investor)" are assigned to nodes at the building level. In the example data models illustrated in FIGS. 4I-4K, "Building 1 (Tenant)," "Building 1 (Investor)," and "Building 2 (Investor)" are assigned to nodes at the building level. In the example data model illustrated in FIG. 5, "Building 1," "Building 2," "Building 3," and "Building 4" are assigned to nodes at the building level.

The fifth highest level in the hierarchy of the data model may include a floor level. A node at the floor level may be assigned to a floor of a building a particular tenant customer occupies, or nodes may be assigned to all of the floors of an investor building. In the example data model illustrated in FIG. 3, Floor 15 is assigned to a node at the floor level for the "Building 1 (Tenant)" building where "Customer 1" is the customer, Floors 1-20 are assigned to nodes at the floor level for the "Building 2 (Investor)" building, Floors 16 and 17 are assigned to nodes at the floor level for the "Building 1 (Tenant)" building where "Customer 2" is the customer, and Floors 1-33 are assigned to nodes at the floor level for the "Building 1 (Investor)" building. In the example data model illustrated in FIGS. 4E and 4F, Floors 1-33 are assigned to nodes at the floor level for the "Building 1 (Investor)" building. In the example data model illustrated in FIG. 4G, Floor 17 is assigned to a node at the floor level in the "Building 1 (Tenant)" building, and Floors 1-33 are assigned to nodes at the floor level in the "Building 1 (Investor)" building.

Figure 4H:
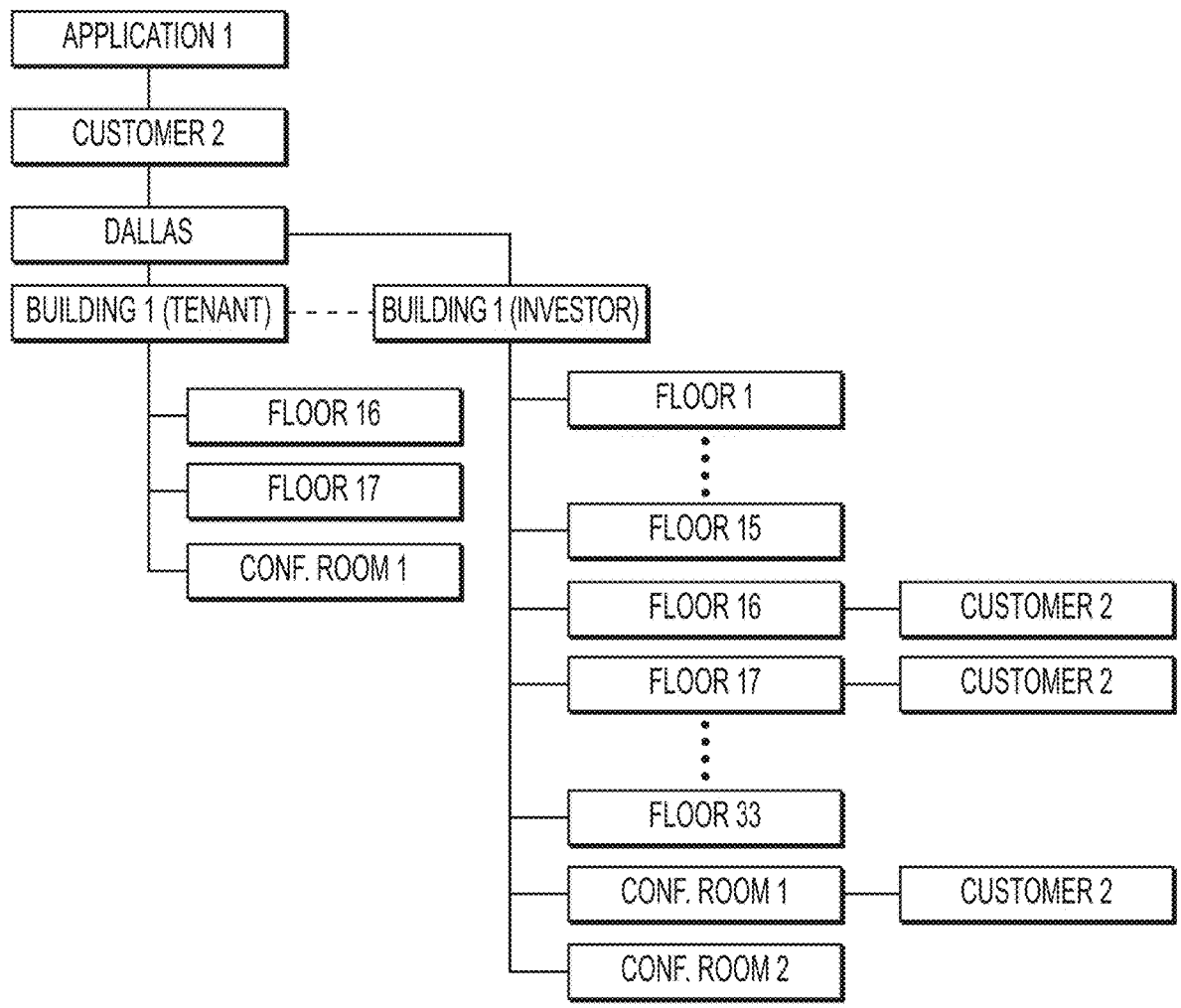

In the example data model illustrated in FIG. 4H, Floors 16 and 17 are assigned to nodes at the floor level in the "Building 1 (Tenant)" building, and Floors 1-33 are assigned to nodes at the floor level in the "Building 1 (Investor)" building. In the example data model illustrated in FIG. 4I, Floors 1-20 are assigned to nodes at the floor level in the "Building 2 (Investor)" building, Floor 16 and Floor 17 are assigned to nodes at the floor level in the "Building 1 (Tenant)" building, and Floors 1-33 are assigned to nodes at the floor level in the "Building 1 (Investor)" building. In the example data models illustrated in FIGS. 4J and 4K, Floor 15 is assigned to a node at the floor level in the "Building 1 (Tenant)" building where "Customer 1" is the customer, Floors 1-20 are assigned to nodes at the floor level in the "Building 2 (Investor)" building, Floor 16 and Floor 17 are assigned to nodes at the floor level in the "Building 1 (Tenant)" building where "Customer 2" is the customer, and Floors 1-33 are assigned to nodes in the "Building 1 (Investor)" building. In the example data model illustrated in FIG. 5, Floor 2 and Floor 3 are assigned to nodes at the floor level in the "Building 4" building where "Customer 3" is the customer, and Floors 1-3 are assigned to nodes at the floor level in the "Building 4" building where "Customer 4" is the customer.

The sixth highest level in the hierarchy of the data model may include an area level. A node at the area level may be assigned to a portion of a floor if, for example, the floor is occupied by more than one tenant. By providing an area level, each area may be tied to a tenant for that area, and tenant details can be assigned to the particular area for the tenant.

The seventh highest level in the hierarchy of the data model may include a shared space level. A node at the shared space level may be assigned to a shared space (e.g., a space that can be booked by a tenant) in a building. In the example data model illustrated in FIG. 3, "Conf. Room 1" is assigned to a node at the shared space level in the "Building 1 (Tenant)" building where "Customer 2" is the customer, and "Conf. Room 1" and "Conf. Room 2" are assigned to nodes at the shared space level in the "Building 1 (Investor)" building. In the example data models illustrated in FIGS. 4E-4G, "Conf. Room 1" and "Conf. Room 2" are assigned to nodes at the shared space level in the "Building 1 (Investor)" building. In the example data models illustrated in FIGS. 4H-4K, "Conf. Room 1" is assigned to a node at the shared space level in the "Building 1 (Tenant)" building where "Customer 2" is the customer, and "Conf. Room 1" and "Conf. Room 2" are assigned to nodes at the shared space level in the "Building 1 (Investor)" building. In the example data model illustrated in FIG. 5, "Conf. Room 1" is assigned to a node at the shared space level in the "Building 4" building where "Customer 3" is the customer, and "Conf. Room 1" and "Conf. Room 2" are assigned to nodes at the shared space level in the "Building 4" building, where "Customer 4" is the customer.

In some embodiments, the roles that may be assigned to a user may include a super administrator role, a customer administrator role, a building administrator role, and/or a tenant administrator role. For example, a user assigned a super administrator role may be able to add, modify, and/or delete any node in the data model and any associations with that node. A super administrator may also have the ability to send out notices to all users of any application using the data model. A super administrator may also have the ability to assign customer administrator roles to users. A user assigned to a customer administrator role may have the ability to send customer level notices, news and/or events. Using the data model illustrated in FIG. 3 as an example, a user assigned a customer administrator role may have the ability to send notices, news, and/or events to all users of any application using the data model in any building in which Customer 2 is an investor or tenant. A user assigned to a customer administrator role may also have the ability to assign building administrator roles to users and/or to assign tenant administrator roles to users. A user assigned a building administrator role may have the ability to send or set notices, events, building information, and/or news to all tenants in a building, or to all users of an application using the data model associated with a tenant in a building. A user assigned a tenant administrator role may have the ability to send or set notices, events, building information, and/or news to a particular tenant in a building, or to all users of an application using the data model associated with a particular tenant in a building.

Additional roles may be created for providing limited access to the data model, such as an end user role that allows limited updating of information in the data model, a concierge role that allows limited updating of information in the data model (e.g., related to dry cleaning services, taxi services), and a vendor role that allows limited updating of information in the data model (e.g., related to food or beverage services or other catering services).

An application, such as the application described in U.S. Provisional Application No. 62/736,872, which is incorporated by reference herein, or an application for use by an administrator, may run on a client device 130, 140. The application may provide access to a data model where, depending on a role associated with a user, the user may have specific entitlements related to buildings or building resources. The term "entitlements," as used herein, refers to specific actions within the application related to the data model, such as whether a user can access and update information to control lights and fixtures, request custodial services, send out notices, or inquire about room and floor data. The types and numbers of entitlements granted to each user depends on the role assigned to that user.

In a preferred embodiment, the data model may be implemented in a hierarchical manner. The data model may map out all users (e.g., owners, operators, tenants, investors, end users, concierges, vendors) who need to access and update information in the data model, and their entitlements for modifying information in the data model. The data model may be composed of nodes and connections. Examples of nodes and connections are provided in FIGS. 3-5. The example nodes are illustrated as rectangles, and the example connections are represented as lines. A node may represent, for example, a region where buildings are located, one specific building within an investor's portfolio, a tenant on a floor of the building, or a conference room available for reservation. A node may be tied to a specific entity when, after the creation of the node, the node is labeled and assigned a role.

The highest level role in the data model may be a super administrator role. A super administrator may be able to create, delete, or modify all nodes within the data model. A super administrator may define the data model by creating nodes and assigning roles. As another example, a building owner may define a portion of a data model representing tenants of a building.

Figure 2:
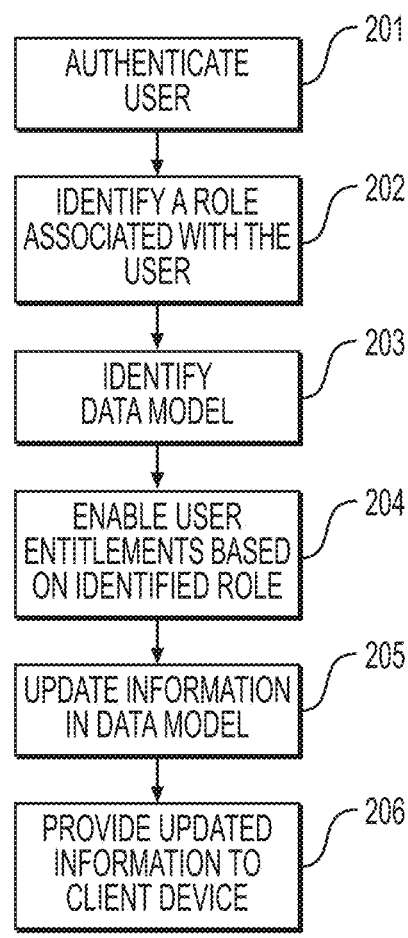
FIG. 2 illustrates an example flowchart of a method for managing information about building resources, consistent with embodiments of the present disclosure.

FIG. 2 illustrates a flowchart of an example method 200, consistent with embodiments of the present disclosure. Example method 200 may be implemented in an environment (see, e.g., FIG. 1) using a computer system (see, e.g., FIG. 2). In some embodiments, method 200 may be performed by a server system 110.

In step 201, a user may be authenticated. For example, a user may open an application, such as the application described in U.S. Provisional Application No. 62/736,872, which is incorporated by reference herein, or an administrator application for managing information in the data model stored in server system 110. The user may enter a credential, such as a username and password, which may be received by server system 110. Server system 110 may then compare the credential with information stored in server system 110 or in database(s) 120 to determine whether the user is authorized to access the data model.

In step 202, a role may be identified as being associated with the user. For example, having authenticated the user, the server system 110 may look up information stored in server system 110 or in database(s) 120 to determine if there is a role associated with the user. The role associated with the user could be any of the roles previously described herein (e.g., super administrator, customer administrator, building administrator, tenant administrator, end user, concierge, vendor).

In step 203, a data model may be identified. The data model may represent information about building resources for tenants and investors in various locations. The data model may include a hierarchy of different levels of information. The ability of a user to add, modify, and delete information at a level in the data model may be limited to users having a role that is associated with that level.

In step 204, a user may be enabled to add, modify, or delete information at a level in the data model based on the role identified for that user. Additional information about types of actions a user with a certain role may take are further described herein.

In step 205, information in the data model may be updated based on information received from the user. For example, a super administrator may add, modify, or delete nodes. As another example, a building administrator may modify building information, such as the location of certain resources in the building. As a further example, a tenant administrator may modify information about the layout of a floor of a building that a tenant rents, or the location of the tenant's building resources on a floor. As still another example, information may be modified in the data model based on information about a building issue sent from an end user.

In step 206, updated information may be provided to a client device 130, 140. For example, the updated information may be provided to a client device 130, 140 for use in an application, such as the application described in U.S. Provisional Application No. 62/736,872, which is incorporated by reference herein.

A data model, such as the data models described herein, may be used to create an investor hierarchy of any new building that is not already stored in a system database. For example, a user can create nodes for a building and for floors in the building in the investor hierarchy. Once the building and floors are created in the investor hierarchy, each floor may be tied to a particular tenant customer. If a particular tenant customer does not exist in the system, a user may first create the tenant customer and then tie the tenant customer to the floor. Once a floor has been tied to a tenant customer (e.g., by a user with a super administrator role), a hierarchy may be created under the tenant customer. The hierarchy of the tenant customer may only include floors of a building that are associated with the particular tenant customer. A user with a super administrator role may add new nodes for buildings and floors, and may associate floors with tenant customers, as needed. When a user with a super administrator role removes an association of a floor and tenant customer from the data model, the hierarchy under the tenant customer may be updated accordingly. Shared spaces may also be associated with a tenant customer in the same manner as floors are associated with a tenant customer. Thus, a data model may be provided in which a user with a super administrator role may easily add, delete, and/or modify any nodes or node associations.

FIGS. 4A-4K illustrate example steps in the creation of the example data model illustrated in FIG. 3. Example data model 405 in FIG. 4A illustrates a data model when a super administrator has been assigned to a root node ("Application 1").

It may not be not be possible to attach a tenant customer to a floor until there is an investor customer floor to which the tenant customer can be tied. Accordingly, a user, such as a super administrator, may create an investor customer hierarchy next. Example data model 410 in FIG. 4B illustrates the data model when a node has been added for an investor customer ("Customer 2"). After the investor customer has been added, a user, such as a super administrator, may wish to add a region under the investor customer. Example data model 415 in FIG. 4C illustrates the data model after a region "Dallas" has been added. A user, such as a super administrator, may then add a node for a building under the region "Dallas" and the investor customer "Customer 2." Example data model 420 in FIG. 4D illustrates the data model where a building "Building 1 (Investor)" has been added to the data model.

After a building has been added to the data model, a user, such as a super administrator or a building administrator, may create nodes for all of the floors and shared spaces in the building. Example data model 425 in FIG. 4E illustrates the data model where nodes have been added under the "Building 1 (Investor)" building for floors 1-33 and for conference rooms 1 and 2.

After the investor hierarchy is created, such as in example data model 425 in FIG. 4E, a user, such as a super administrator or building administrator, may tie tenant customers to floors. For example, in addition to being an investor customer, "Customer 2" may also be a tenant customer as a tenant on floor 17, for example. A user, such as a super administrator or building administrator, may tie "Customer 2" as a tenant customer to floor 17 in the data model. Example data model 430 in FIG. 4F illustrates the data model where a node has been tied to floor 17 in the data model to identify "Customer 2" as a tenant customer as a tenant of floor 17. Once "Customer 2" has been tied to floor 17 as a tenant customer, a tenant hierarchy may be created in the data model under the customer "Customer 2." Example data model 435 in FIG. 4G illustrates the data model where a tenant hierarchy has been created in the data model under the customer "Customer 2" to indicate that "Customer 2" is a tenant customer as a tenant of floor 17 of the "Building 1" building. Similarly, additional floors in the investor hierarchy may be tied to the tenant customer, and nodes for these floors may be added to the tenant hierarchy. Example data model 440 in FIG. 4H illustrates the data model where tenant customer "Customer 2" has been also been tied to floor 16 and conference room 1 in the investor hierarchy, and as a result nodes for floor 16 and conference room 1 have been added to the tenant hierarchy.

Figure 4I:
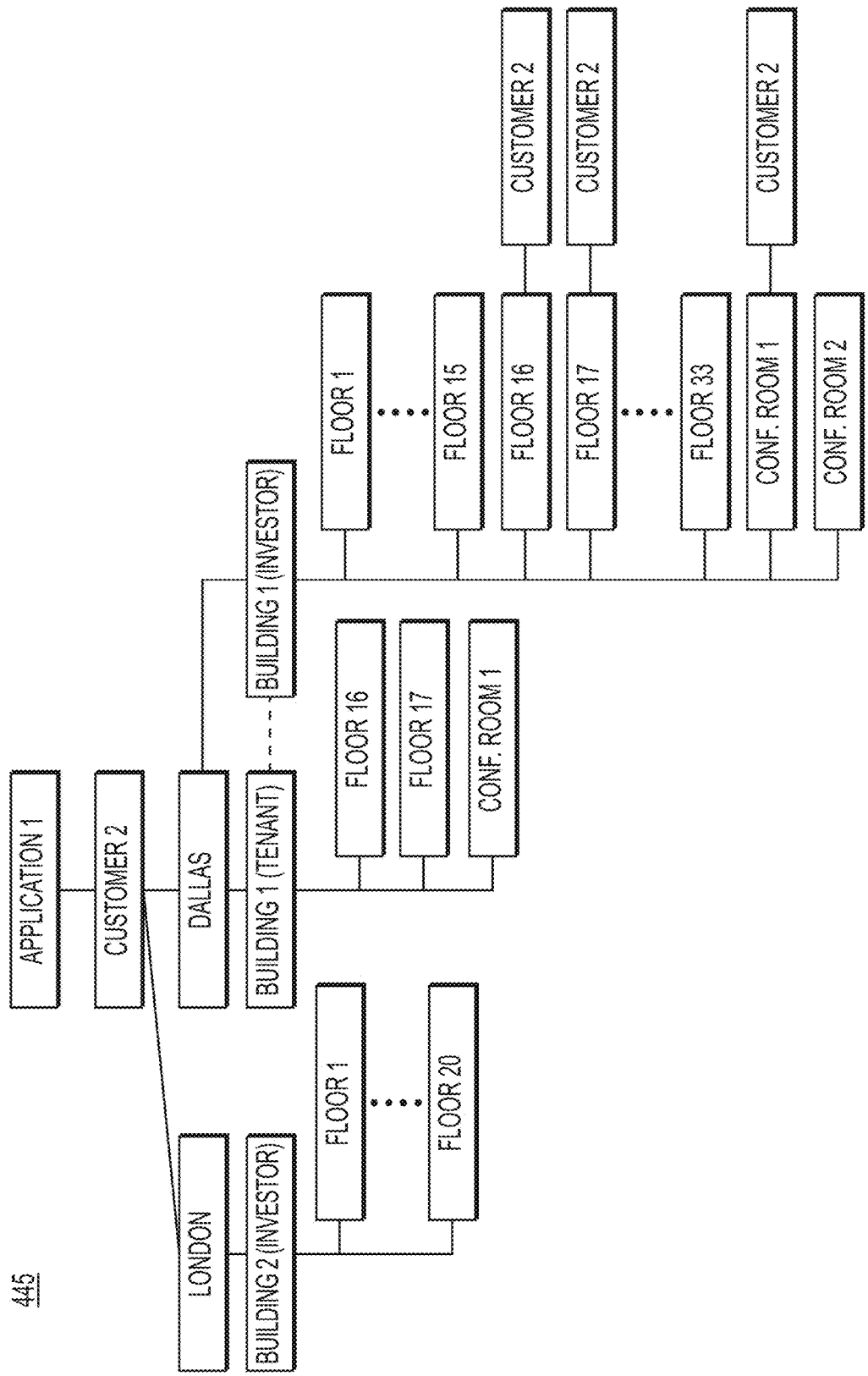
Figure 5:
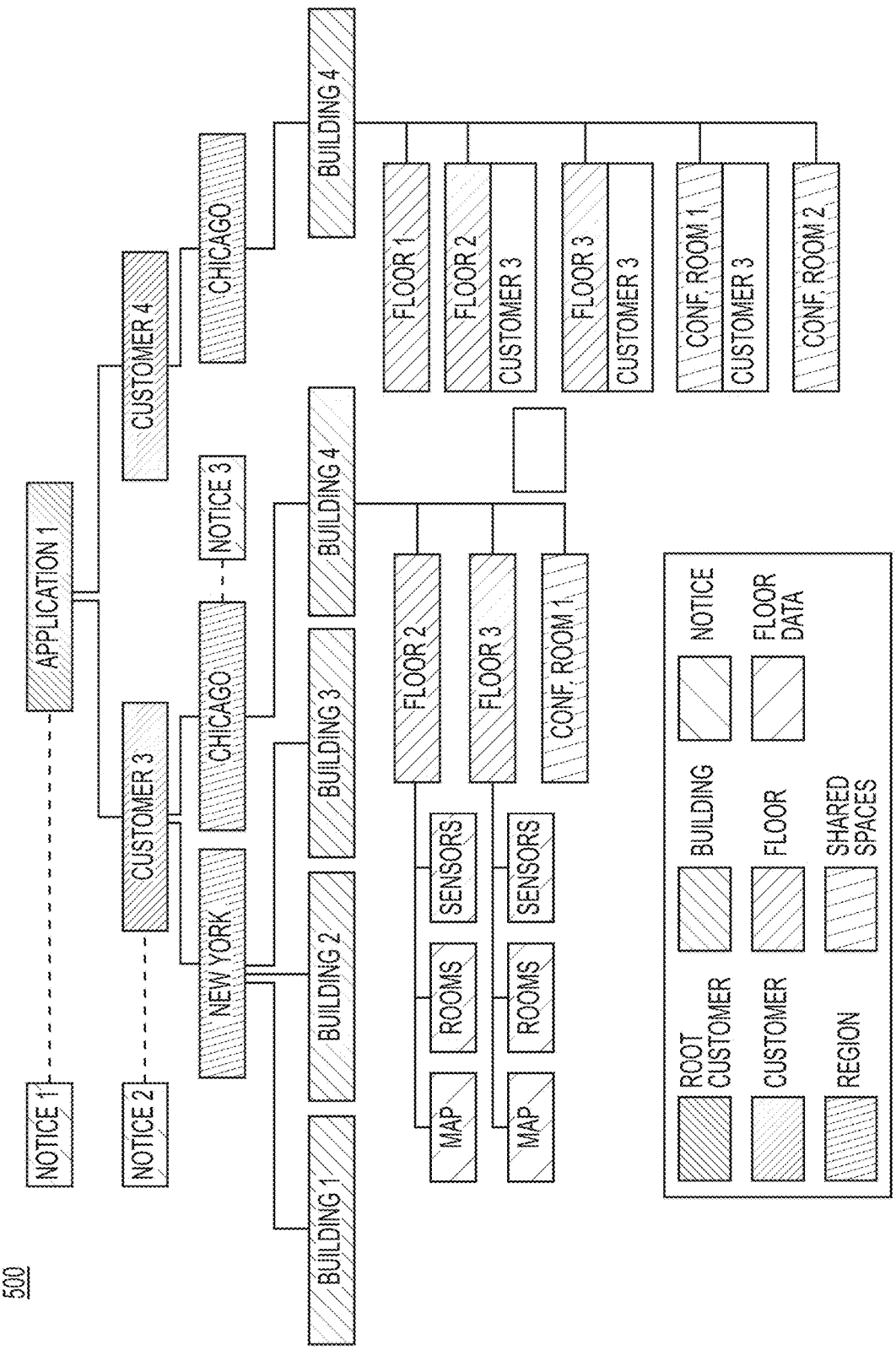
FIG. 5 illustrates another example diagram of a data model, consistent with embodiments of the present disclosure.

Example data model 445 in FIG. 4I illustrates the data model where another investor hierarchy has been created in the data model for another building that customer "Customer 2" owns in another region "London." As shown in data model 445, nodes are added for region "London," building "Building 2 (Investor)," and Floors 1-20.

Figure 4J:
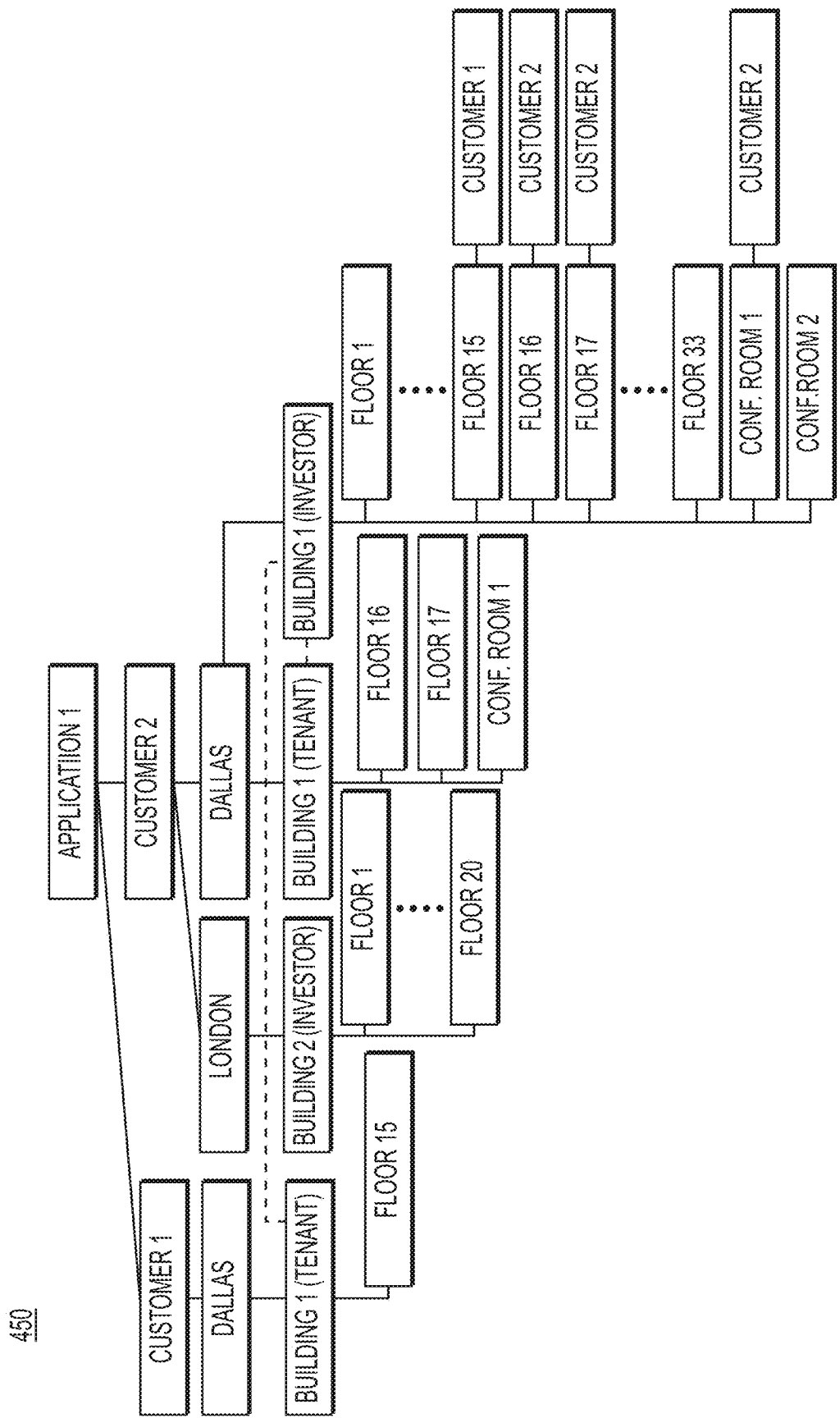
Figure 4K:
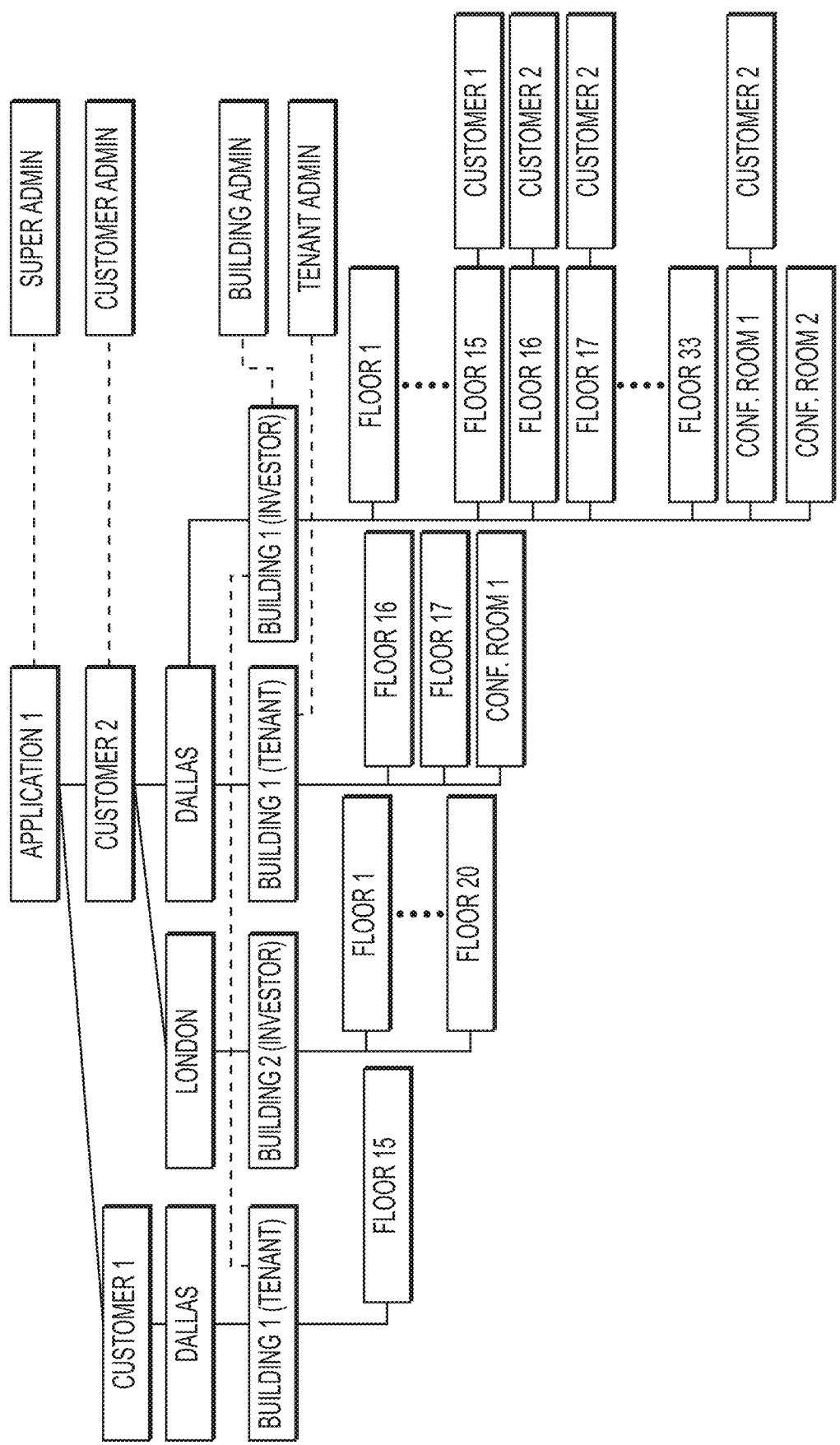

Example data model 450 in FIG. 4J illustrates the data model where a user, such as a super administrator, has added another customer "Customer 1" to the data model. In this example, "Customer 1" is a tenant customer as a tenant of floor 15 in the "Building 1" building. The user has added a node tying the tenant customer "Customer 1" to floor 15 in the investor hierarchy for the "Building 1" building. A tenant hierarchy that includes "Customer 1" at the customer level, "Dallas" at the region level, "Building 1 (Tenant)" at the building level, and floor 15 at the floor level, is also created, as illustrated in data model 450 in FIG. 4J.

After the investor and tenant hierarchies have been created, a user, such as a super administrator, may attach roles to nodes in the data model. Users assigned to that role may then make changes to data according to the data model from that node and nodes connected to that node lower in the hierarchy. In example data model 455 illustrated in FIG. 4K, the user has attached the role super administrator to the root node "Application 1" in the hierarchy, and the role "customer administrator" to the customer node "Customer 2" in the hierarchy. The user has also attached the role building administrator to the building node "Building 1 (Investor)" in the hierarchy, and has attached the role tenant administrator to the building node "Building 1 (Tenant)" in the hierarchy.

All of the above tie ups or associations may be performed by a user, such as a super administrator, using a user interface. For example, the user may select from a series of drop down menus and may select buttons to create nodes, type text to add names and other information to nodes, and select buttons to save the created nodes, their tie ups and associations, and information associated with the nodes. Users may be assigned roles. Any user assigned a role that has been associated with a particular level in the data model may set or send building information, notices, news, and/or events at that level and below in the hierarchy.

Once an investor and tenant hierarchy have been created and roles have been assigned, a user having a role at a particular level in the hierarchy may add various building information, notices, news, and/or events to update data in the data model. This information may then be used by an application using the data model, such as the application described in U.S. Provisional Application No. 62/736,872, which is incorporated by reference herein. Example data model 500 in FIG. 5 illustrates a data model where information has been added to nodes in the data model. For example, a notice "Notice 1" has been added to all users of the application using the data model. A notice "Notice 2" has been added to all users of the application using the data model that are associated with the customer "Customer 3." A notice "Notice 3" has been added to all users of the application using the data model that are associated with the region "Chicago" of the customer "Customer 3." Information has also been added to floors 2 and 3 of the building "Building 4" associated with the customer "Customer 3." This information includes a map of the floor, information about rooms on the floor, and information about sensors on the floor.

Figure 6:
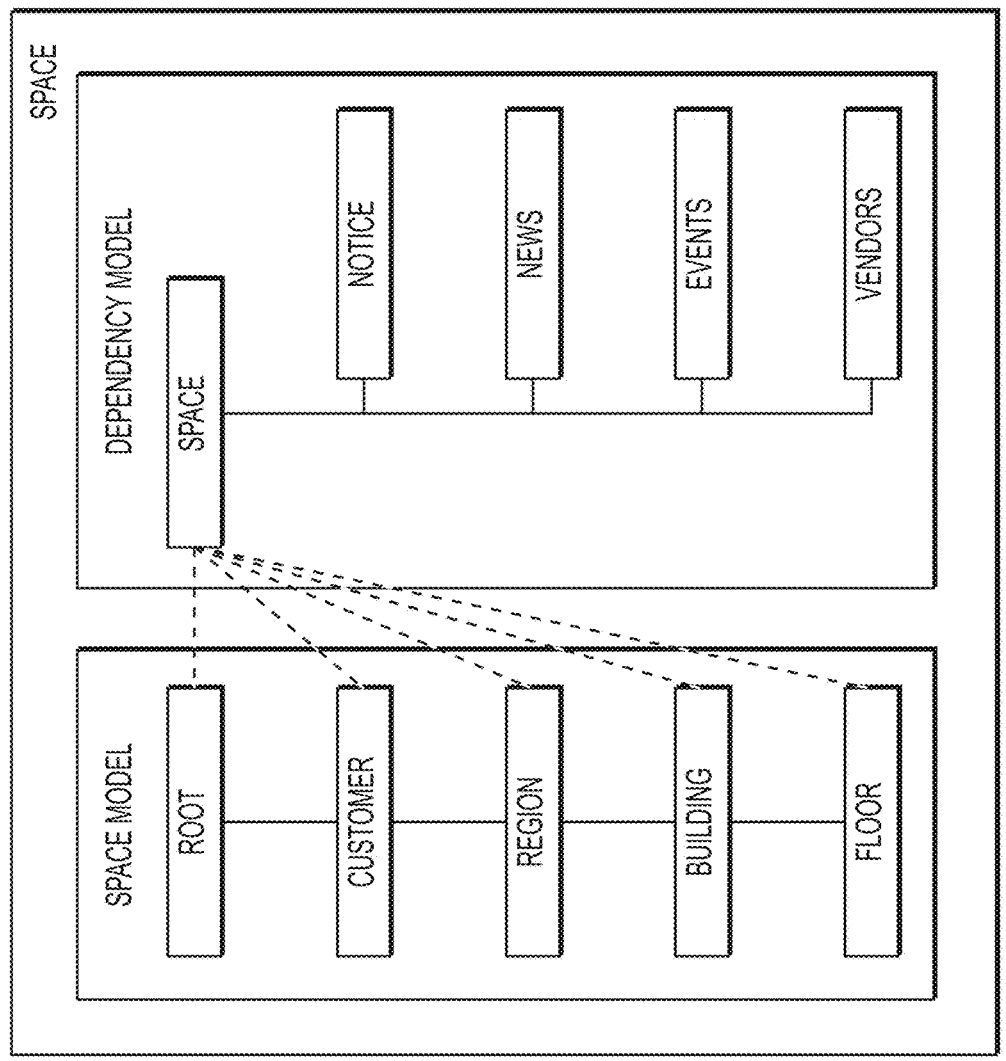
FIG. 6 illustrates an example diagram of a space model describing different spaces, and a dependency model describing information associated with a space.

FIG. 6 illustrates an example diagram 600 of a space model describing different spaces, and a dependency model describing information that may be associated with spaces. For example, diagram 600 illustrates that various information can be associated with nodes at various levels in a data model, such as the root level, customer level, region level, building level, and floor level. Example diagram 600 illustrates notices, news, events, and vendors as information that may be associated with nodes at any of these levels.

Figure 7:
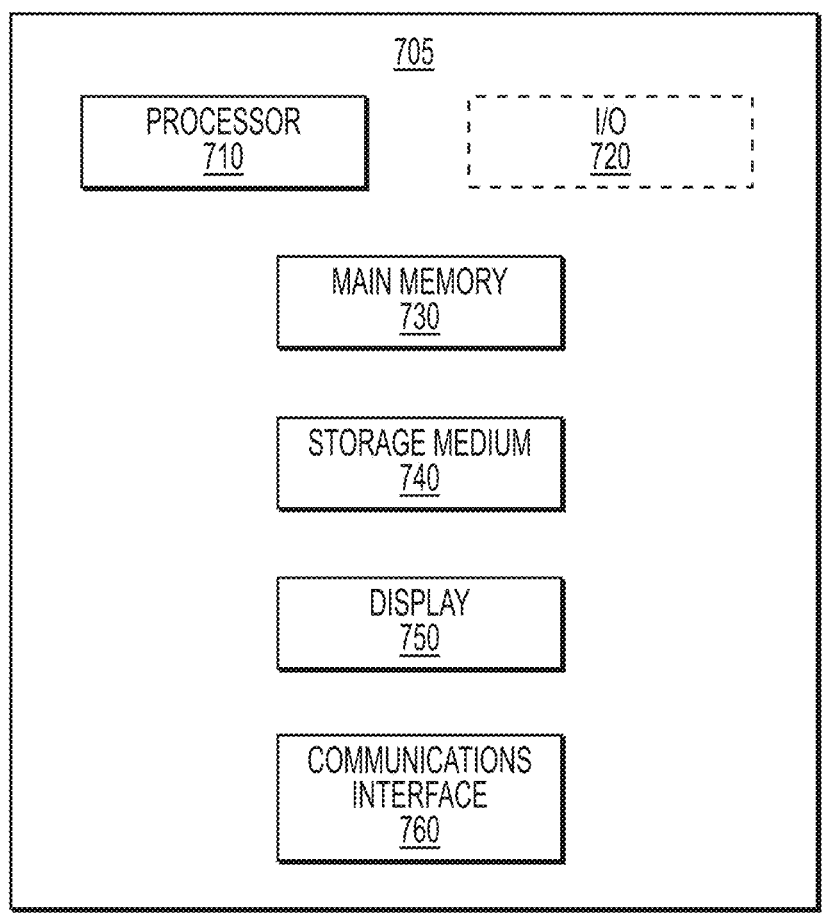
FIG. 7 illustrates an example diagram of a computer system for implementing embodiments and features consistent with the present disclosure.

FIG. 7 is a block diagram illustrating an example computer system 700 that may be used for implementing embodiments consistent with the present disclosure, including the example systems and methods described herein. Computer system 700 may include one or more computing devices 705. Computer system 700 may be used to implement client device(s) 130, 140, or server system 110. The arrangement and number of components in computer system 700 is provided only for purposes of illustration. Additional arrangements, number of components, or other modifications may be made, consistent with the present disclosure.

As shown in FIG. 7, a computer system 700 may include one or more computing devices 705. A computing device may include one or more processors 710 for executing instructions. Processors suitable for the execution of instructions include, by way of example, both general and special purpose microprocessors, and any one or more processors of any kind of digital computer. A computing device 705 may also include one or more input/output (I/O) devices 720. By way of example, I/O devices 720 may include keys, buttons, mice, joysticks, styluses, gesture sensors (e.g., video cameras), motion sensors (e.g, infrared sensors, ultrasound sensors), voice sensors (e.g., microphones), etc. Keys and/or buttons may be physical and/or virtual (e.g., provided on a touch screen interface).

A computing device 705 may include one or more storage devices configured to store data and/or software instructions used by processor(s) 710 to perform operations consistent with the disclosed embodiments. For example, a computing device 705 may include main memory 730 configured to store one or more software programs that, when executed by processor(s) 710, cause processor(s) 710 to perform functions or operations consistent with disclosed embodiments. By way of example, main memory 730 may include NOR or NAND flash memory devices, read only memory (ROM) devices, random access memory (RAM) devices, etc. A computing device 705 may also include one or more storage medium(s) 740. By way of example, storage medium(s) 740 may include hard drives, solid state drives, tape drives, redundant array of independent disks (RAID) arrays, etc. Although FIG. 7 illustrates only one main memory 730 and one storage medium 740, a computing device 705 may include any number of main memories 730 and storage mediums 740. Further, although FIG. 7 illustrates main memory 730 and storage medium 740 as part of computing device 705, main memory 730 and/or storage medium 740 may be located remotely and computing device 705 may be able to access main memory 730 and/or storage medium 740 via one or more network(s).

Storage medium(s) 740 may be configured to store data, and may store data received from one or more of server(s) 110 or client device(s) 130, 140. The data may take or represent various content or information forms, such as documents, presentations, textual content, graphical content, mapping information, geographic information, directory information, polling information, user profile information, software applications, event information, scheduled meeting information, personnel information, calendar information, room status information, room booking information, and any other type of information and/or content in which user may be interested, or any combination thereof. The data may further include other data received, stored, and/or inferred by computer system 700, such as data regarding user preference information, space occupancy status information, space booking status information, building issue information, and/or any other data used for carrying out features of an end user application, such as the end user application described in U.S. Provisional Application No. 62/736,872, which is incorporated by reference herein.

A computing device 705 may also include one or more displays (not shown). Display(s) may be implemented using one or more display panels, which may include, for example, one or more cathode ray tube (CRT) displays, liquid crystal displays (LCDs), plasma displays, light emitting diode (LED) displays, organic light emitting diode (OLED) displays, touch screen type displays, projector displays (e.g., images projected on a screen or surface, holographic images, etc.), field emission displays (FEDs), active matrix displays, vacuum fluorescent (VFR) displays, 3-dimensional (3-D) displays, electronic paper (e-ink) displays, microdisplays, or any combination of the above types of displays.

A computing device 705 may further include one or more communications interfaces 760. Communication interface(s) 760 may allow content, software, data, messages, and/or other information to be transferred between server(s) 110 and client device(s) 130, 140. Examples of communication interface(s) 760 may include modems, network interface cards (e.g., an Ethernet card), communications ports, personal computer memory card international association (PCMCIA) slots and card, antennas, etc. Communication interface(s) 760 may transfer software, content, data, messages, or other information in the form of signals, which may be electronic, electromagnetic, optical, and/or other types of signals. The signals may be provided to/from communications interface 760 via a communication path (e.g., Bluetooth network, Wi-Fi network, network(s) 150), which may be implemented using wired, wireless, cable, fiber optic, radio frequency (RF), and/or other communication channels.

A computer system 700 may continue additional or fewer components depending on whether the computer system is a client device 130, 140 or server system 110.

The subject matter disclosed herein can be implemented in digital electronic circuitry, or in computer software, firmware, or hardware, including the structural means disclosed in this specification and structural equivalents thereof, or in combination of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of computer programs include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, certain computers might also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices (e.g., EPROM, EEPROM, and flash memory devices), magnetic disks (e.g., internal hard disks or removable disks); magneto optical disks; and optical disks (e.g., CD and DVD disks). The processor and the memory can be supplemented by, or incorporated in, special purpose logic circuitry.

To provide for interaction with a user, some subject matter described herein can be implemented on a computer having a display device, e.g., a CRT (cathode ray tube) or LCD (liquid crystal display) monitor, for displaying information to the user, and a keyboard and a pointing device (e.g., a mouse, trackball, touchscreen), by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

Some subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or a combination of such back end, middleware, and front end components. The components of the system can be interconnected by any form of medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the foregoing description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A computer-implemented method implemented by a server system for providing data to an end user application, the server system comprising one or more processors and one or more memory devices, the one or more memory devices storing computer-executable instructions, the method comprising executing the instructions by the one or more processors to cause the one or more processors to preform processing comprising:
    storing a representation of a building floorplan and a data model as the computer-executable instructions in the server system, the data model comprising a hierarchy of different levels and representing information about the buildings resources for tenants and investors in various geographical locations, each level of the data model being assigned with a role to allow a user to interact with the end user application through a user interface to add, modify, and delete the information about the building resources associated with that level and one or more respective lower levels connected to that level in the hierarch;
    executing the data model to manage building resources associated with the building floorplan through the end user application running on a user device over a network,
    authenticating the user based on a credential input by the user to determine whether the user is authorized to access the data model through the user device;
    in response to determining that the user is authorized to access the data model, identifying the role associated with the user;
    operating the user device by the user through the user interface to add, modify, and delete information about the building resources associated with that level and the one or more lower respective levels connected to that level in the data model based on the role identified for the user through the end user application;
    updating information in the data model based on information received from the user; and
    providing the updated information to a client device for use in the end user application that provides information about the building resources.

2. The method of claim 1, wherein the different levels in the hierarchy within the data model represents one or more of: a root customer, a customer, a region, a building in the region, a floor of the building, an area of the floor, or a space.

3. The method of claim 1, wherein the role associated with the respective level is assigned to one of a plurality types of users comprising: a super administrator, a customer administrator, a building administrator, a tenant administrator, a client, a vendor, or a concierge, and wherein the role assigned to the user and associated with a particular level in the data model allows the user to access, create, update or send the information about the building resources at that level and below in the hierarchy, the information about the building resources comprising a floor map, locations of different spaces on the floor, tools dispersed in the different spaces, or persons in a building associated with the building floorplan.

4. The method of claim 3, wherein the super administrator is assigned with the role to interact with an end user application through a user interface to access the data model to add, modify, or delete information at any level of the data model.

5. The method of claim 3, wherein the customer administrator is an investor customer, a tenant customer, or both an investor customer and a tenant customer.

6. The method of claim 3, wherein the customer administrator is assigned with the role to interact with an end user application through a user interface to add information to the data model that causes a notice to be sent to client devices associated with an investor customer or tenant customer.

7. The method of claim 3, wherein the building administrator is assigned with the role to interact with an end user application through a user interface to add information to the data model that causes information to be sent to client devices associated with all tenants of the building, wherein the information sent to the client devices is one of: a notice, an event, building information, or news.

8. The method of claim 3, wherein the tenant administrator is assigned with the role to interact with an end user application through a user interface to add information to the data model that causes information to be sent to client devices associated with a tenant, wherein the information sent to the client devices is one of: a notice, an event, building information, or news.

9. A server system for providing data to an end user application, the system comprising:
    one or more memory devices storing instructions; and
    one or more processors, the instructions being executed by the one or more processors to cause the one or more processors to:
        storing a representation of a building floorplan and a data model as the computer-executable instructions in the server system, the data model comprising a hierarchy of different levels and representing information about the buildings resources for tenants and investors in various geographical locations, each level of the data model being assigned with a role to allow a user to interact with the end user application through a user interface to add, modify, and delete the information about the building resources associated with that level and one or more respective lower levels connected to that level in the hierarch;
        executing the data model to manage building resources associated with the building floorplan through the end user application running on a user device over a network,
        authenticate a user based on a credential input by the user to determine whether the user is authorized to access the data model through the user device;
        in response to determining that the user is authorized, identify the data model and the role associated with the user;
        operating the user device by the user through the user interface to add, modify, and delete information about the building resources associated with that level and the one or more lower respective levels connected to that level in the data model based on the role identified for the user through the end user application;

update information in the data model based on information received from the user; and provide the updated information to a client device for use in the end user application that provides information about the building resources.

10. The server system of claim 9, wherein the hierarchy of the different levels within the data model comprise one or more of: a root customer, a customer, a region, a building in the region, a floor of the building, an area of the floor, or a shared space.

11. The server system of claim 9, wherein the role associated with the respective level is assigned to one of a plurality types of users comprising: a super administrator, a customer administrator, a building administrator, a tenant administrator, a client, a vendor, or a concierge, and wherein the role assigned to the user and associated with a particular level in the data model allows the user to access, create, update or send the information about with the building resources at that level and below in the hierarchy, the information about the building resources comprising a map of a floor, locations of different spaces on the floor, tools dispersed in the different spaces, or persons in a building associated with the building floorplan.

12. The server system of claim 11, wherein the super administrator is assigned with the role to interact with an end user application through a user interface to access the data model to add, modify, or delete information at any level of the data model.

13. The server system of claim 11, wherein the customer administrator is an investor customer, a tenant customer, or both an investor customer and a tenant customer.

14. The server system of claim 11, wherein the customer administrator is assigned with the role to interact with an end user application through a user interface to add information to the data model that causes a notice to be sent to client devices associated with an investor or tenant customer.

15. The server system of claim 11, wherein the building administrator is assigned with the role to interact with an end user application through a user interface to add information to the data model that causes information to be sent to client devices associated with all tenants of the building, wherein the information sent to the client devices is one of: a notice, an event, building information, or news.

16. The server system of claim 11, wherein the tenant administrator is assigned with the role to interact with the end user application through a user interface to add information to the data model that causes information to be sent to client devices associated with a tenant, wherein the information sent to the client devices is one of: a notice, an event, building information, or news.

17. A non-transitory computer readable medium storing instructions that, when executed by one or more processors of a server system, cause the one or more processors to perform processing comprising:

storing a representation of a building floorplan and a data model as the computer-executable instructions in the server system, the data model comprising a hierarchy of different levels and representing information about the buildings resources for tenants and investors in various geographical locations, each level of the data model being assigned with a role to allow a user to interact with the end user application through a user interface to add, modify, and delete the information about the building resources associated with that level and one or more respective lower levels connected to that level in the hierarch;

executing the data model to manage building resources associated with the building floorplan through the end user application running on a user device over a network, authenticating a user based on a credential input by the user to determine whether the user is authorized to access a data model;

in response to determining that the user is authorized, identifying the data model and the role associated with the user;

operating the user device by the user through the user interface to add, modify, and delete information about the building resources associated with that level and the one or more lower respective levels connected to that level in the data model based on the role identified for the user through the end user application;

updating information in the data model based on information received from the user; and providing the updated information to a client device for use in the end user application that provides information about the building resources.

18. The non-transitory computer readable medium of claim 17, wherein the different levels in the hierarchy within the data model comprises one or more of: a root customer, a customer, a region, a building in the region, a floor of the building, an area of the floor, or a shared space.

19. The non-transitory computer readable medium of claim 17, wherein the role associated with the respective level is assigned to one of a plurality types of users comprising: a super administrator, a customer administrator, a building administrator, a tenant administrator, a client, a vendor, or a concierge, and wherein the role assigned to the user and associated with a particular level in the data model allows the user to access, create, update or send the information about the building resources at that level and below in the hierarchy, the information about the building resources comprising a map of a floor, locations of different spaces on the floor, tools dispersed in the different spaces, or persons in a building associated with the building floorplan.

20. The non-transitory computer readable medium of claim 19, wherein the super administrator is assigned with the role to interact with the end user application through a user interface to access the data model to add, modify, or delete information at any level of the data model.

* * * * *